(12) United States Patent
Yuri

(10) Patent No.: US 9,977,230 B2
(45) Date of Patent: May 22, 2018

(54) MICROSCOPE SYSTEM

(71) Applicant: OLYMPUS CORPORATION, Tokyo (JP)

(72) Inventor: Kiyoshi Yuri, Tokyo (JP)

(73) Assignee: OLYMNPUS CORPORATION, Tokyo (JP)

( * ) Notice: Subject to any disclaimer, the term of this patent is extended or adjusted under 35 U.S.C. 154(b) by 209 days.

(21) Appl. No.: 14/934,414

(22) Filed: Nov. 6, 2015

(65) Prior Publication Data
US 2016/0139389 A1 May 19, 2016

(30) Foreign Application Priority Data

Nov. 18, 2014 (JP) ................................. 2014-233553

(51) Int. Cl.
G02B 21/00 (2006.01)
G02B 21/36 (2006.01)
(Continued)

(52) U.S. Cl.
CPC ....... *G02B 21/008* (2013.01); *G02B 21/0076* (2013.01); *G02B 21/16* (2013.01);
(Continued)

(58) Field of Classification Search
CPC .. G01K 9/00; G01N 21/6428; G01N 21/6458; G02B 21/16; G02B 21/365; G06T 5/50; G06T 7/0012; G06T 2207/30024
See application file for complete search history.

(56) References Cited

U.S. PATENT DOCUMENTS

2003/0231791 A1* 12/2003 Torre-Bueno ...... G01N 21/6428
382/133
2005/0269495 A1 12/2005 Kakemizu
(Continued)

FOREIGN PATENT DOCUMENTS

EP 1 085 292 A1 3/2001
EP 1 808 688 A1 7/2007
(Continued)

OTHER PUBLICATIONS

Extended European Search Report dated Apr. 18, 2016 in related European Application No. 15 19 3622.6.

Primary Examiner — Frank Huang
(74) Attorney, Agent, or Firm — Scully, Scott, Murphy & Presser, P.C.

(57) ABSTRACT

A microscope system includes a virtual-slide microscope that acquires a virtual-slide image of a specimen when mounted on a first stage, and a fluorescence microscope that acquires a fluorescence image of the specimen when mounted on a second stage. The virtual-slide microscope includes a display and an image-capturing-condition setting portion that sets image capturing conditions, including a fluorescence-image acquisition position, on the virtual-slide image. The fluorescence microscope includes a memory portion that stores coordinate transformation data between the coordinates of the specimen when fixed on the first stage and the coordinates of the specimen when fixed on the second stage, a condition input portion to which the image capturing conditions are input, and a driving-condition setting portion that sets a driving condition on the basis of the image capturing conditions and the coordinate transformation data.

6 Claims, 3 Drawing Sheets

(51) Int. Cl.
  *G06T 5/50* (2006.01)
  *H04N 5/372* (2011.01)
  *H04N 5/232* (2006.01)
  *G02B 21/16* (2006.01)

(52) U.S. Cl.
  CPC .............. *G02B 21/367* (2013.01); *G06T 5/50* (2013.01); *H04N 5/23206* (2013.01); *H04N 5/23293* (2013.01); *H04N 5/372* (2013.01); *G06T 2207/10056* (2013.01); *G06T 2207/10064* (2013.01); *G06T 2207/20221* (2013.01)

(56) References Cited

U.S. PATENT DOCUMENTS

| | | | |
|---|---|---|---|
| 2012/0183198 A1* | 7/2012 | Zahniser | G06K 9/00134 382/133 |
| 2013/0250091 A1 | 9/2013 | Takayama et al. | |

FOREIGN PATENT DOCUMENTS

| | | |
|---|---|---|
| JP | 2006-023285 A | 1/2006 |
| JP | 2010-286565 A | 12/2010 |
| WO | 2001/84209 A2 | 11/2001 |
| WO | 2012/099574 A1 | 7/2012 |

* cited by examiner

MICROSCOPE SYSTEM

TECHNICAL FIELD

Cross-Reference to Related Applications

This application is based on Japanese Patent Application No. 2014-233553, the contents of which are incorporated herein by reference.

The present invention relates to a microscope system.

BACKGROUND ART

There are known microscopes that include a CCD for acquiring a map image of a wide field-of-view of a specimen, and a laser-scanning image capturing unit that acquires a fluorescence image of a smaller area of the specimen (for example, see PTL 1).

CITATION LIST

Patent Literature

{PTL 1}
Japanese Unexamined Patent Application, Publication No. 2010-286565

SUMMARY OF INVENTION

Technical Problem

An aspect of the present invention is a microscope system including a virtual-slide microscope that acquires a virtual-slide image, which is formed by joining images of partial areas of a specimen that are sequentially captured while moving the specimen, which is mounted on a first stage; and a fluorescence microscope that acquires a fluorescence image by irradiating the specimen mounted on a second stage with excitation light. The virtual-slide microscope includes a display that displays the acquired virtual-slide image, and an image-capturing-condition setting portion that sets image capturing conditions, including a position where the fluorescence microscope acquires the fluorescence image, on the virtual-slide image displayed on the display. The fluorescence microscope includes a memory portion that stores coordinate transformation data between coordinates of the specimen when fixed on the first stage and coordinates of the specimen when fixed on the second stage, a condition input portion to which the image capturing conditions set by the image-capturing-condition setting portion are input, and a driving-condition setting portion that sets a driving condition of the fluorescence microscope on the basis of the image capturing conditions input to the condition input portion and the coordinate transformation data stored in the memory portion.

DESCRIPTION OF EMBODIMENT

A microscope system 1 according to an embodiment of the present invention will be described below with reference to the drawings.

Figure 1:
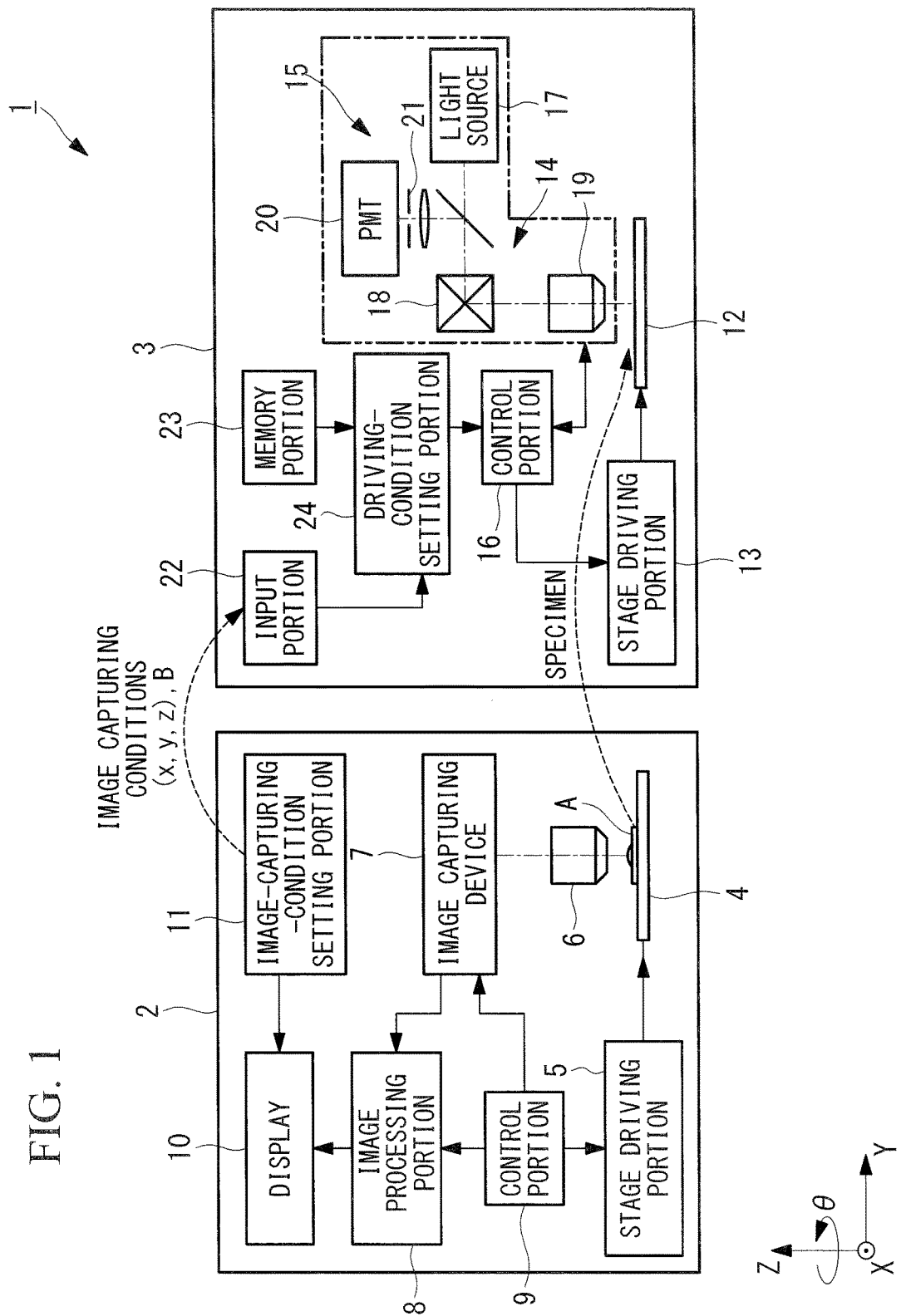
FIG. 1 is a diagram showing the overall configuration of a microscope system according to an embodiment of the present invention.

As shown in FIG. 1, the microscope system 1 according to this embodiment includes a virtual-slide microscope 2 that acquires a virtual-slide image of a specimen A, and a laser-scanning microscope (fluorescence microscope) 3 that acquires a fluorescence image of the specimen A.

The virtual-slide microscope 2 is a special microscope for acquiring a virtual-slide image and includes a stage (first stage) 4 on which the specimen A is mounted, a stage driving portion 5, an optical system 6 and an image capturing device 7 that capture the image of light from the specimen A, an image processing portion 8 that generates a virtual-slide image by joining the images acquired by the image capturing device 7, and a control portion 9 that controls the stage driving portion 5, the image capturing device (for example, CCD) 7, and the image processing portion 8. The stage 4 is provided with a fixing mechanism (not shown) that fixes the specimen A once positioned.

The image processing portion 8 and the control portion 9 are formed of, for example, a personal computer including a CPU (central processing unit).

The virtual-slide microscope 2 includes a display (for example, a monitor) 10 that displays the virtual-slide image generated by the image processing portion 8, and an image-capturing-condition setting portion 11 that sets image capturing conditions, including an acquisition position where a fluorescence image is intended to be acquired, on the virtual-slide image displayed on the display 10.

In the image-capturing-condition setting portion 11, an observer specifies an area where the fluorescence image is intended to be acquired, while moving the virtual-slide image displayed on the display 10, by using a keyboard, a mouse, or the like.

Figure 2:
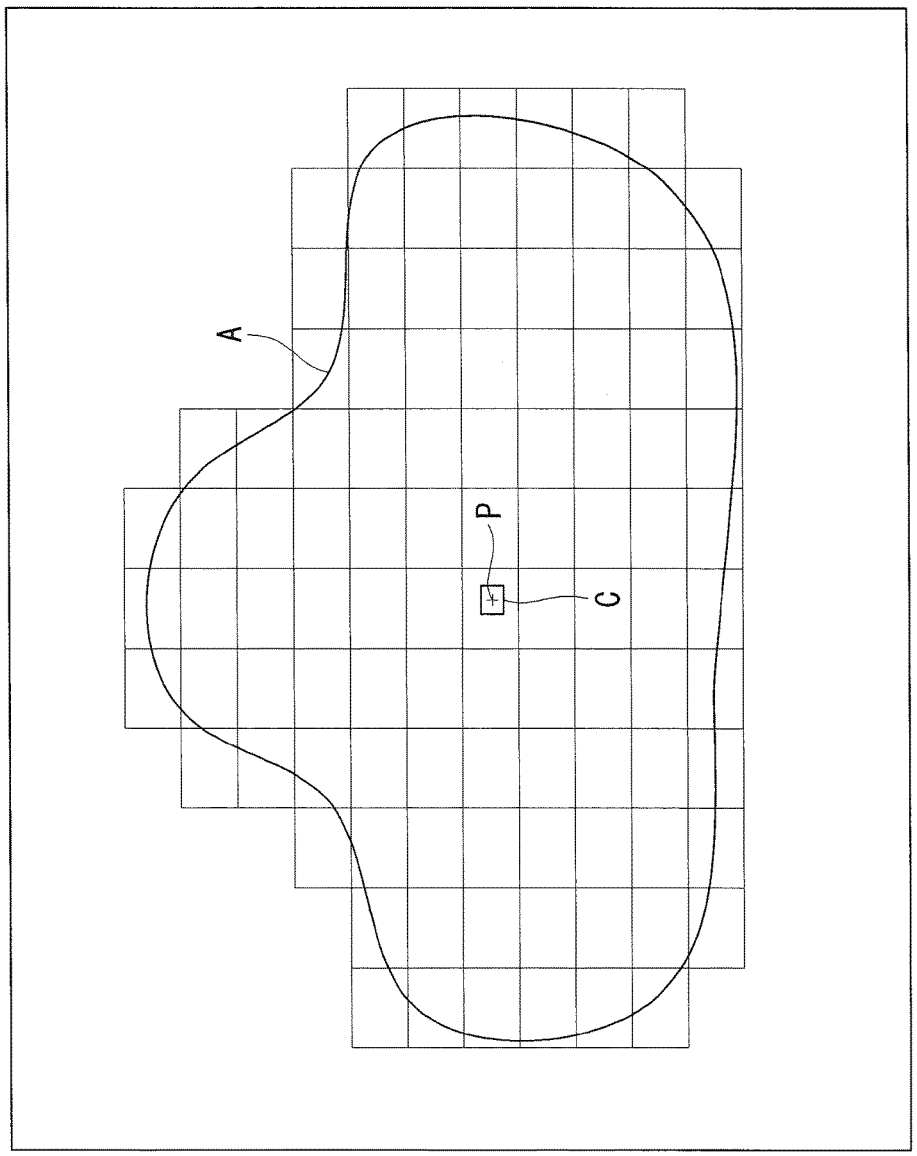
FIG. 2 is a diagram showing a virtual-slide image acquired by the microscope system in FIG. 1 and a cursor indicated thereon.

For example, a method of specifying the area is as follows: by specifying the resolution of a fluorescence image, a rectangular cursor C having a size corresponding to the specified resolution is indicated on the display 10, as shown in FIG. 2. By moving the cursor C over the virtual-slide image and laying it on an area where the fluorescence image is intended to be acquired, the coordinates at the central position P of the cursor C are acquired. In this way, the position coordinates of the area where a fluorescence image is intended to be acquired, in the specimen A fixed on the stage 4 of the virtual-slide microscope 2, and the resolution are set as the image capturing conditions.

The laser-scanning microscope 3 is a special microscope for acquiring a fluorescence image, and it includes a stage (second stage) 12 that carries the specimen A, a stage driving portion 13, an illumination optical system 14 that scans excitation light over the specimen A, a detection optical system 15 that detects fluorescence generated at some positions on the specimen A irradiated with the excitation light by the illumination optical system 14, and the control portion 16 that controls the stage driving portion 13, the illumination optical system 14, and the detection optical system 15 and generates a fluorescence image from the detected fluorescence and the scanning position of the excitation light. The stage 12 of the laser-scanning microscope 3 is also provided with a fixing mechanism (not shown) for fixing the specimen A once positioned.

The illumination optical system 14 includes a scanner 18, such as a galvanometer mirror, that two-dimensionally scans the excitation light emitted from an excitation light source (laser light source) 17, and an objective lens 19 that focuses the excitation light scanned by the scanner 18 onto the specimen A. The detection optical system 15 includes a photodetector (fluorescence detector) 20, such as a photomultiplier tube (PMT), that detects the fluorescence collected by the objective lens 19. The detection optical system 15 may employ either a method in which the fluorescence returning via the scanner 18 is detected by the photodetector 20 after passing through a confocal pinhole 21 or a method in which multiphoton fluorescence generated in the specimen A is split off immediately after the objective lens 19 and is detected by the photodetector 20.

The laser-scanning microscope 3 according to this embodiment includes an input portion (condition input portion) 22 to which the image capturing conditions set in the virtual-slide microscope 2 are input, a memory portion 23 that stores coordinate transformation data between the coordinates of the specimen A fixed on the stage 4 of the virtual-slide microscope 2 and the coordinates of the specimen A fixed on the stage 12 of the laser-scanning microscope 3, and a driving-condition setting portion 24 that sets driving conditions of the stage driving portion 13, the illumination optical system 14, and the detection optical system 15, which are controlled by the control portion 16, according to the image capturing conditions input from the input portion 22 and according to the coordinate transformation data stored in the memory portion 23.

The coordinate transformation data stored in the memory portion 23 is obtained by preliminarily measuring the coordinate system of the origin of the specimen A when fixed on the stage 4 of the virtual-slide microscope 2 and the coordinate system of the origin of the same specimen A when fixed on the stage 12 of the laser-scanning microscope 3 and by calculating the amount of shift of the origin ($\Delta x$, $\Delta y$) and the amount of rotation $\theta$ about the z-axis.

The driving-condition setting portion 24 converts the coordinates (x, y, z) of the fluorescence-image acquisition position in the coordinate system of the virtual-slide microscope 2, input from the input portion 22, to coordinates in the laser-scanning microscope 3, according to the coordinate transformation data stored in the memory portion 23. Furthermore, when a resolution B, set as the image capturing conditions in the virtual-slide microscope 2, is input from the input portion 22, the driving-condition setting portion 24 sets the magnification of the objective lens 19 and the scanning range for the scanner 18 such that the input resolution B is achieved.

In the thus-configured microscope system 1 according to this embodiment, an observer first places a specimen A on the stage 4 of the virtual-slide microscope 2 and activates the virtual-slide microscope 2. In the virtual-slide microscope 2, due to the control portion 9 controlling the stage driving portion 5 so as to move the stage 4 in two directions (X- and Y-directions) perpendicular to the optical axis (Z-axis) of the objective lens of the optical system 6 and causing the image capturing device 7 to capture images, images of a plurality of partial areas of the specimen A are acquired. The acquired images are joined together in the image processing portion 8, whereby a virtual-slide image is generated.

Next, the observer causes the generated virtual-slide image to be displayed on the display 10 of the virtual-slide microscope 2 and sets the position where a fluorescence image is intended to be acquired and the resolution B on the display 10, by using the image-capturing-condition setting portion 11. The acquisition position and the resolution B are set as follows: when the observer sets the resolution in the image-capturing-condition setting portion 11, the rectangular cursor C having a size corresponding to the resolution is indicated on the virtual-slide image displayed on the display 10, as shown in FIG. 2. Then, the cursor C is moved over the virtual-slide image and is overlaid on the position where the fluorescence image is intended to be acquired. In this way, the coordinates of the central position P of the cursor C are set as the acquisition position.

In this state, the observer removes the specimen A from the stage 4 of the virtual-slide microscope 2 and fixes it on the stage 12 of the laser-scanning microscope 3. Then, the resolution B and the data about the fluorescence-image acquisition position, serving as the image capturing conditions set in the virtual-slide microscope 2, are input from the input portion 22. The data is transferred by using a storage medium, such as an IC memory, or via a network and is input to the input portion 22 of the laser-scanning microscope 3.

In the laser-scanning microscope 3, the driving-condition setting portion 24 transforms the coordinates of the input fluorescence-image acquisition position by using the coordinate transformation data stored in the memory portion 23, selects the objective lens 19, and sets the scanning range of the excitation light scanned by the scanner 18, on the basis of the input resolution. Then, the control portion 16 controls the stage driving portion 13, the illumination optical system 14, and the detection optical system 15 by using the driving condition set by the driving-condition setting portion 24, whereby a desired fluorescence image can be acquired.

As has been described above, with the microscope system 1 according to this embodiment, by separating the virtual-slide microscope 2 and the laser-scanning microscope 3, a dedicated apparatus that serves as the virtual-slide microscope 2 can be employed, leading to an advantage that it is possible to acquire a high-resolution virtual-slide image of a wide area of the specimen A in a short time. Although separating the virtual-slide microscope 2 and the laser-scanning microscope 3 requires transferring the specimen A, even though the specimen A is transferred, by converting the coordinates according to the coordinate transformation data stored in the memory portion 23, the fluorescence image at the acquisition position set in the virtual-slide microscope 2 can be precisely acquired by the laser-scanning microscope 3.

Specifically, because the image capturing conditions, including the fluorescence-image acquisition position, for the laser-scanning microscope 3 is set in the virtual-slide microscope 2 that acquires a virtual-slide image, the image capturing conditions can be easily set, without needing to move a great deal of virtual-slide image data.

Although the fluorescence-image acquisition position and the resolution are set as the image capturing conditions in this embodiment, in addition to them, other image capturing conditions, such as the intensity and wavelength of the excitation light emitted from the laser light source 17, the sensitivity of the photomultiplier tube, etc. may be set in the virtual-slide microscope 2. By doing so, the setting work performed at the laser-scanning microscope 3 side is reduced, enabling a fluorescence image to be easily acquired.

Although the laser-scanning microscope 3 is shown as an example of the fluorescence microscope in this embodiment, instead of this, a fluorescence microscope of another type may be employed.

Although not a virtual-slide image itself, but only the image capturing conditions are input to the laser-scanning microscope 3 in this embodiment, instead of this, the virtual-slide image may be input to the laser-scanning microscope 3, together with the image capturing conditions, and a display (not shown) that displays the virtual-slide image and a fluorescence image may be provided at the laser-scanning microscope 3 side.

Figure 3:
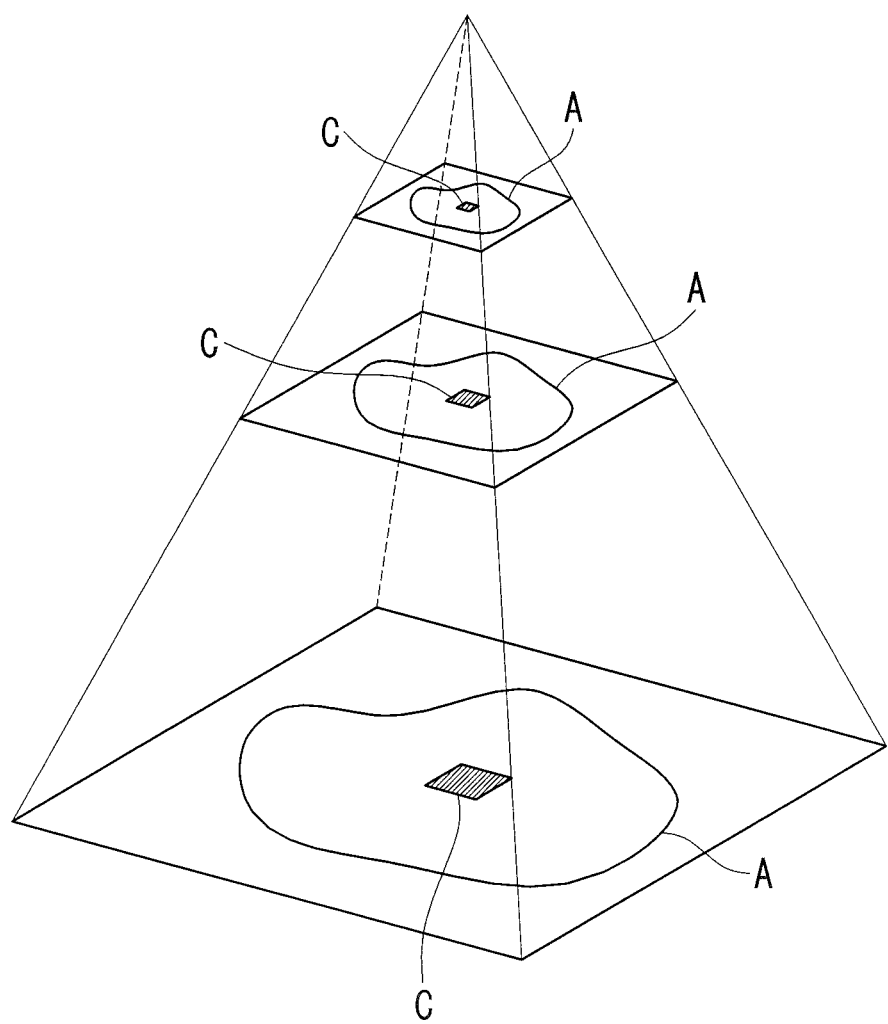
FIG. 3 is a diagram showing a virtual-slide image having a pyramidal structure, acquired by a modification of the microscope system in FIG. 1, in which fluorescence images are embedded in respective levels.

The virtual-slide image generated by the virtual-slide microscope 2 may be a virtual-slide image having a pyramidal structure, as shown in FIG. 3, which includes multiple levels of images having different resolutions. By doing so, when the virtual-slide image is displayed on the display 10, zooming can be performed at high speed, and the work of setting the fluorescence-image acquisition position can be made easy.

Then, when this virtual-slide image having the pyramidal structure is input to the laser-scanning microscope 3, the resolution of the acquired fluorescence image is converted to the resolutions equal to the resolutions corresponding to the respective levels of the virtual-slide image by reducing the size, and a virtual-slide image embedded at the acquisition position set by the image-capturing-condition setting portion 11 may be generated.

This configuration provides an advantage that it is possible to perform zooming at high speed when the virtual-slide image and the fluorescence image are observed with the laser-scanning microscope 3.

The above-described embodiment is derived from the individual aspects of the present invention below.

An aspect of the present invention is a microscope system including a virtual-slide microscope that acquires a virtual-slide image, which is formed by joining images of partial areas of a specimen that are sequentially captured while moving the specimen, which is mounted on a first stage; and a fluorescence microscope that acquires a fluorescence image by irradiating the specimen mounted on a second stage with excitation light. The virtual-slide microscope includes a display that displays the acquired virtual-slide image, and an image-capturing-condition setting portion that sets image capturing conditions, including a position where the fluorescence microscope acquires the fluorescence image, on the virtual-slide image displayed on the display. The fluorescence microscope includes a memory portion that stores coordinate transformation data between coordinates of the specimen when fixed on the first stage and coordinates of the specimen when fixed on the second stage, a condition input portion to which the image capturing conditions set by the image-capturing-condition setting portion are input, and a driving-condition setting portion that sets a driving condition of the fluorescence microscope on the basis of the image capturing conditions input to the condition input portion and the coordinate transformation data stored in the memory portion.

According to this aspect, when a virtual-slide image is acquired by joining images of partial areas of the specimen mounted on the first stage of the virtual-slide microscope, which images are sequentially captured while moving the specimen, the acquired virtual-slide image is displayed on the display. The observer can set the image capturing conditions, including the fluorescence-image acquisition position, on the virtual-slide image displayed on the display, by using the image-capturing-condition setting portion. By separating the virtual-slide microscope from the fluorescence microscope, a dedicated virtual-slide microscope can be employed, and thus, a high-resolution, wide-area virtual-slide image can be acquired at high speed and in a short time.

Thereafter, the specimen on the first stage is transferred onto the second stage. When the image capturing conditions set by the image-capturing-condition setting portion are input from the condition input portion of the fluorescence microscope, the driving-condition setting portion sets the driving condition of the fluorescence microscope on the basis of the input image capturing conditions and the coordinate transformation data stored in the memory portion. Specifically, because the coordinates changed by moving the specimen between the two microscope stages are converted according to the coordinate transformation data, a fluorescence image of a small area located at the specified acquisition position can be easily and precisely acquired by the fluorescence microscope just by inputting the image capturing conditions, including the fluorescence-image acquisition position, specified on the virtual-slide image from the condition input portion.

In the above aspect, the image-capturing-condition setting portion may set the fluorescence-image acquisition position and the resolution as the image capturing conditions.

With this configuration, the fluorescence-image acquisition position set by the image-capturing-condition setting portion at the coordinates of the specimen on the first stage is converted to the coordinates of the specimen on the second stage by the driving-condition setting portion, according to the coordinate transformation data stored in the memory portion. Furthermore, an area of the fluorescence image to be acquired by the fluorescence microscope is set according to the set resolution. Therefore, by driving the fluorescence microscope on the basis of the converted coordinates of the acquisition position and the set area of the fluorescence image, a fluorescence image of the position specified on the virtual-slide image can be easily acquired.

In the above aspect, the fluorescence microscope may include a laser light source that emits excitation light, and a fluorescence detector that detects fluorescence, and the image-capturing-condition setting portion may set the intensity of the laser light radiated from the laser light source onto the specimen and the sensitivity of the fluorescence detector as the image capturing conditions.

With this configuration, when the fluorescence-image acquisition position is set on the virtual-slide image, the intensity of the laser light and the sensitivity of the fluorescence detector may also be set. Thus, the task of making settings in the fluorescence microscope is eliminated, which makes acquisition of a fluorescence image even easier.

In the above aspect, the image-capturing-condition setting portion may set the image capturing conditions in association with the virtual-slide image, and the condition input portion may receive the virtual-slide image associated with the image capturing conditions.

With this configuration, the virtual-slide image input to the condition input portion can be observed with the fluorescence microscope.

In the above aspect, the virtual-slide microscope may generate a virtual-slide image having a pyramidal structure, which includes multiple levels of images having different resolutions, and the fluorescence microscope may convert the acquired fluorescence image to images having the resolutions equal to the resolutions corresponding to the respective levels of the virtual-slide image and generate a virtual-slide image that is embedded at the acquisition position set by the image-capturing-condition setting portion.

With this configuration, the acquired fluorescence image is superposed on the virtual-slide image observed with the fluorescence microscope. Hence, also when observation is performed in a different resolution, the fluorescence image superposed on the virtual-slide image can be viewed.

In the above aspect, the condition input portion may be connected to the virtual-slide microscope via a network that transmits the image capturing conditions.

With this configuration, because the image capturing conditions set by the image-capturing-condition setting portion are input to the condition input portion via the network, data exchange can be performed without a manual operation, thus making acquisition of a fluorescence image even easier.

REFERENCE SIGNS LIST 1 microscope system
2 virtual-slide microscope
3 laser-scanning microscope (fluorescence microscope)
4 stage (first stage)
10 display
11 image-capturing-condition setting portion
12 stage (second stage)
17 excitation light source (laser light source)
20 photodetector (fluorescence detector)
22 input portion (condition input portion)
23 memory portion
24 driving-condition setting portion
A specimen

The invention claimed is:

1. A microscope system comprising:
a virtual-slide microscope comprising a first stage configured to have a sample mounted thereon, an optical system and a sensor that is configured to capture images of light from a specimen, a first stage driving portion that is configured to drive the first stage in a direction perpendicular to an optical axis of an objective lens of the optical system to cause the sensor to capture a plurality of partial areas of the specimen, and a processor configured to process images that generate a virtual-slide image by joining the images acquired for the plurality of partial areas of the specimen; and
a fluorescence microscope comprising a second stage configured to have the specimen mounted thereon, a second stage driving portion that is configured to drive the second stage, an illumination optical system that is configured to scan excitation light over the specimen, a detection optical system that is configured to detect fluorescence generated at some positions on the specimen irradiated with the excitation light, and a controller that is configured to control the second stage driving portion, the illumination optical system and the detection optical system, and is configured to generate a fluorescence image from the detected fluorescence and the scanning position of the excitation light, wherein
the virtual-slide microscope comprises a display that is configured to display the virtual-slide image, and an image-capturing-condition setting portion that sets image capturing conditions, comprising a position where the fluorescence microscope acquires the fluorescence image, on the virtual-slide image displayed on the display,
the fluorescence microscope comprises a memory that is configured to store coordinate transformation data, a condition input to which the image capturing conditions set by the image-capturing-condition setting portion are input, and a driving-condition setting portion that is configured to set a driving condition of the fluorescence microscope on the basis of the image capturing conditions input to the condition input and the coordinate transformation data stored in the memory, wherein
the coordinate transformation data is obtained by a preliminarily measurement of the coordinate system of an origin of the specimen when fixed on the first stage of the virtual-slide microscope and the coordinate system of the origin of the specimen when fixed on the second stage of the fluorescence microscope and by a calculation of the amount of shift of the origin and the amount of rotation about the z-axis perpendicular to x-axis and y-axis directions, wherein the driving-condition setting portion is configured to set a driving condition of the fluorescence microscope by converting coordinates of a fluorescence-image acquisition position set by the image-capturing-condition setting portion to coordinates at the time of acquiring the fluorescence image in the fluorescence microscope, on the virtual-slide image on the display, on the basis of the amount of shift and the amount of rotation of the coordinate transformation data, and the controller is configured to move the second stage based on the driving condition.

2. The microscope system according to claim 1, wherein the image-capturing-condition setting portion is configured to set the fluorescence-image acquisition position and the resolution as the image capturing conditions.

3. The microscope system according to claim 2, wherein
the fluorescence microscope comprises a laser light source that emits excitation light, and a fluorescence detector that detects fluorescence, and
the image-capturing-condition setting portion is configured to set the intensity of the excitation light radiated from the laser light source onto the specimen and the sensitivity of the fluorescence detector as the image capturing conditions.

4. The microscope system according to claim 1, wherein
the image-capturing-condition setting portion is configured to set the image capturing conditions in association with the virtual-slide image, and
the condition input is configured to receive the virtual-slide image associated with the image capturing conditions.

5. The microscope system according to claim 4, wherein
the virtual-slide microscope generates a virtual-slide image having a pyramidal structure, which comprises multiple levels of images having different resolutions, and
the fluorescence microscope is configured to convert the acquired fluorescence image to images having the resolutions equal to the resolutions corresponding to the respective levels of the virtual-slide image and configured to generate a virtual-slide image that is embedded at the acquisition position set by the image-capturing-condition setting portion.

6. The microscope system according to claim 1, wherein the condition input is connected to the virtual-slide microscope via a network that is configured to transmit the image capturing conditions.

* * * * *